Feb. 11, 1969  D. W. McGRATH  3,426,508
FILTER UNIT FOR AIR SYSTEMS
Filed Aug. 9, 1967
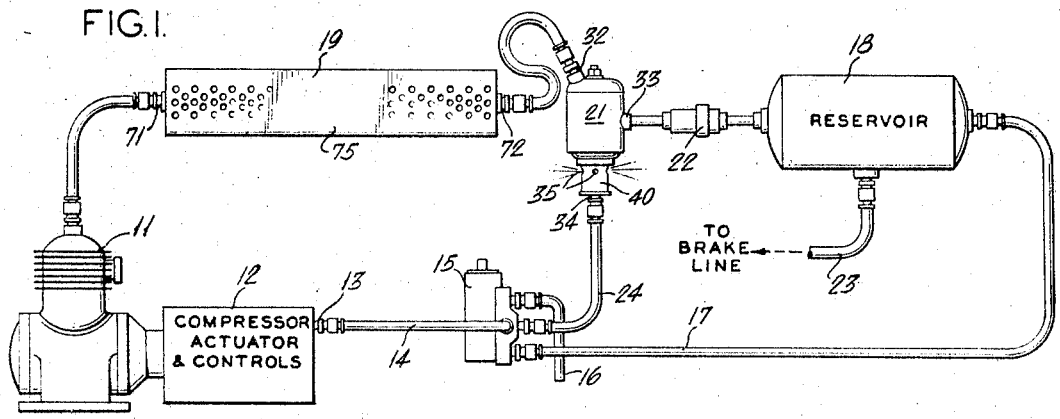
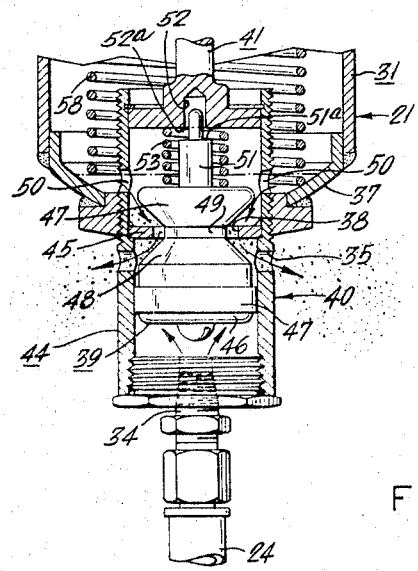
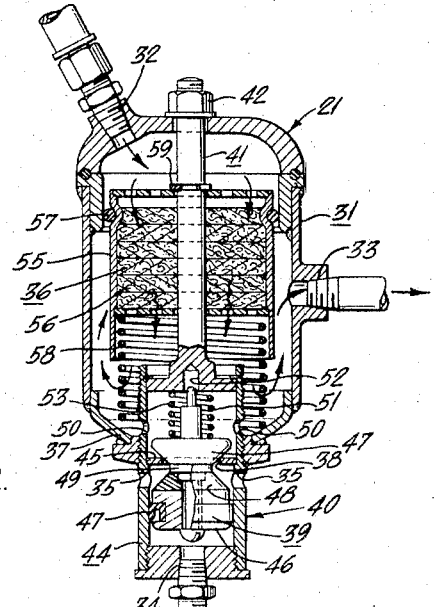
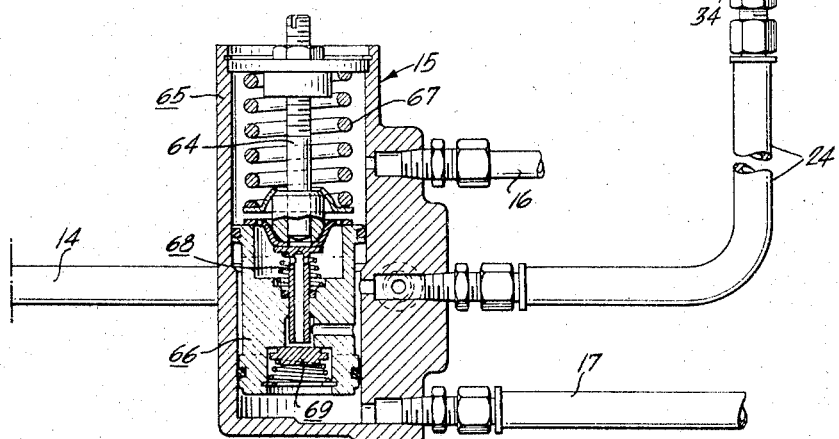
INVENTOR:
D. WAYNE McGRATH
BY Howson & Howson
ATTYS.

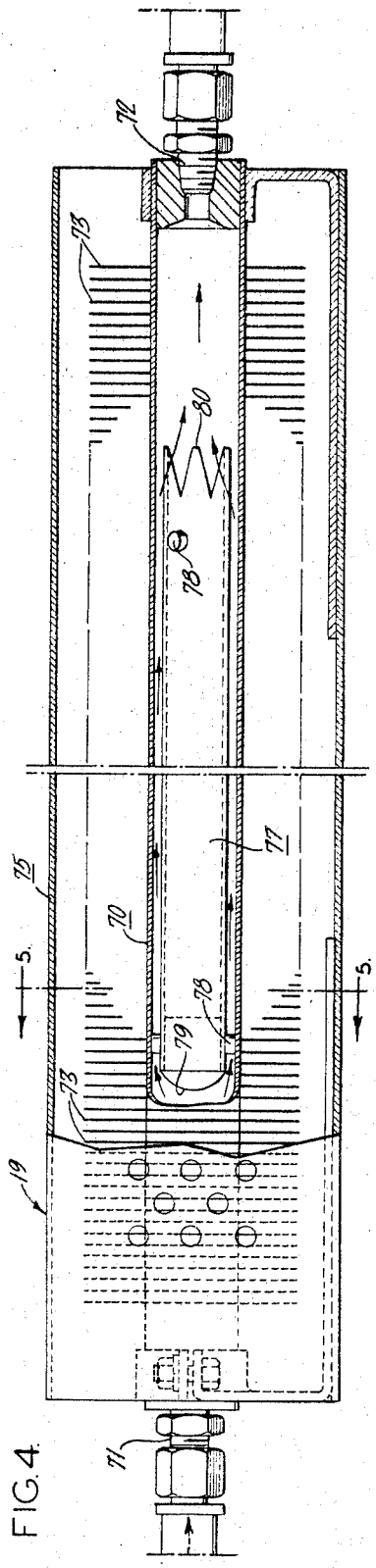
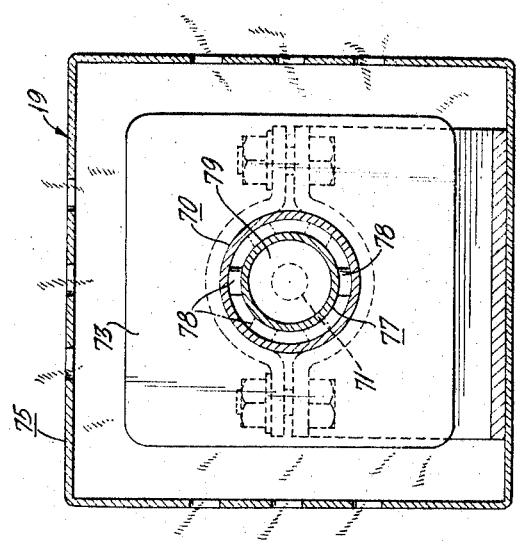

United States Patent Office 3,426,508
Patented Feb. 11, 1969

3,426,508
FILTER UNIT FOR AIR SYSTEMS
Doyle Wayne McGrath, Fletcher Road,
Wayne, Pa. 19087
Filed Aug. 9, 1967, Ser. No. 659,455
U.S. Cl. 55—210     8 Claims
Int. Cl. B01d 35/00

ABSTRACT OF THE DISCLOSURE

In an air system, a filter device for removing excess heat, liquids and solids from the air prior to its passage into a reservoir, the system including a cooler and a filter unit. The filter unit has a filter element to entrap solid particles and a sump to collect liquid droplets normally entrained in the air stream. The sump is provided with an unloading valve which is automatically operated momentarily when the compressor is either shut down or energized to discharge any liquid accumulated in the sump.

---

The present invention relates to improvements in air systems, and has particular application to air systems for controlling the air brakes of automotive vehicles as well as supplying the necessary air for other impedimenta on the motor vehicle, such as air powered windshield wipers, air starters, air suspension, air steering, etc.

In a conventional air brake system, the air brakes are operated from an air reservoir mounted adjacent the brakes. The reservoir is normally maintained with an air pressure in the range of 95 to 130 p.s.i. by means of a compressor driven from the engine of the vehicle. The compressor is controlled by an actuator and a governor having a connection to the reservoir, an exhaust, and an unloading port connection to the actuator. The governor operates so that when the pressure in the reservoir falls below the lower limit of the desired range, the governor unloading port is cut off from the reservoir pressure and is opened to exhaust, removing air pressure from the actuator and energizing the compressor. The compressor then operates to elevate the pressure in the reservoir to within the range desired, and when the pressure reaches the upper limit of the range, the governor again operates to disconnect the unloading port from the exhaust and connect it to the reservoir pressure, thereby arresting or shutting down the compressor. The compressor remains shut down until sufficient air is used from the reservoir to lower the pressure therein to the lower limit.

Such systems operate satisfactorily to maintain the desired pressure range within the reservoir, but require frequent servicing because of damage or wear to the parts by solid particles entrained in the air stream or by oil and water which condenses from the air stream as it loses the heat imparted thereto in the compressor. Various types of filter units have been applied to air systems for removing contaminants; however, such filters tend to become clogged if not serviced regularly and the clogging of the filter may result in pressure losses which cause the compressor to operate for excessive periods, and in severe cases, may entail a reduction in pressure in the air reservoir sufficient to impair the normal operation of the brakes, often causing malfunction of the system to the extent that the brakes become inoperative and accidents result. Failure of the brake system cannot be tolerated and consequently, such filters have not been widely adopted for automotive braking systems.

To overcome the difficulties of such filters, a combined filter and cooling device has been made in which a safety feature is incorporated which operates to cause the compressed air to by-pass the filtering element when the element becomes clogged sufficiently to cause a dangerous pressure drop therethrough. U.S. Patent No. 2,840,183 discloses such a unit. This unit has not been entirely satisfactory because of the cost of installing and maintaining it in proper operating condition.

Such filters also accumulate water or oil vapor which condenses in the filter unit and require periodic bleeding to discharge the accumulated liquid therefrom. As the range of travel of automotive vehicles increases, the opportunity for such bleeding becomes less frequent and, it is therefore desirable to incorporate in such filters an automatic bleeding device which opens the filter unit to atmosphere to permit discharge of the accumulated liquid therefrom. The automatic bleeding device operates to open the filter unit to exhaust the accumulated liquid to atmosphere during the periods when the compressor is shut down. While such devices operate satisfactorily to bleed the accumulated liquid from the filter unit, there is a substantial loss of air therethrough, and in the event there is reverse leakage through the check valve connecting the filter unit to the reservoir, the reservoir pressure may be depleted. Furthermore, the automatic bleeding units which are presently available, are relatively expensive to manufacture and install and require frequent servicing.

With the foregoing in mind, the present invention provides an air system having a novel heat exchanger and a novel filter unit which operate to reduce the temperature of the compressed air to within the desired limits and furthermore operate to remove foreign matter from the air, and to automatically discharge condensed liquid from the system.

A further object of the present invention is to provide a filter unit of improved simplified construction which operates effectively to segregate foreign matter, both solid particulate matter and liquid drops, from the air stream, and which incorporates safety means to prevent loss of pressure in the event of blockage of the filter.

A still further object of the invention is to provide an improved simplified filter unit having an automatic bleeding device which affords momentary discharge of accumulated liquid from the unit at periodic intervals, for example upon energization and shut-down of the compressor.

A still further object of the present invention is to provide an automatic bleeding unit for a filter which operates for only a limited period of time to open the sump of the filter to the atmosphere so that, except during operation of the bleeding means, the filter unit is protected against atmospheric air, thereby preventing intrusion of dirt, dust, or other foreign matter into the system through the filter unit.

All of the objects of the present invention are more fully set forth hereinafter with reference to the accompanying drawings wherein:

FIG. 1 is a schematic view of an air system embodying apparatus made in accordance with the present invention;

FIG. 2 is a fragmentary sectional view illustrating a filter unit and the compressor governor under conditions which exist when the compressor is operating;

FIG. 3 is an enlarged fragmentary sectional view of the automatic bleed-off device illustrating the condition thereof during the intervals when the compressor is being energized and being arrested;

FIG. 4 is an enlarged view with portions broken away of the heat exchanger illustrated in FIG. 1; and FIG. 5 is a transverse sectional view taken along the line 5—5 of FIG. 4.

Referring now to the drawings, and the system illustrated in FIG. 1, the compressor is shown diagrammatically at 11 and the conventional control therefor are indicated at 12. As stated above, the control operates to energize the compressor when the unloading port 13 of the control is open to exhaust, for example by means of the line 14, the governor 15 and the exhaust line 16. The compressor is arrested when the unloading port 13 is subjected to reservoir pressure, for example through the line 14, the governor 15 and the reservoir line 17. When the compressor 11 is energized and operating, it operates to charge the brake reservoir 18 through a heat exchanger 19, a filter unit 21, and a check valve 22. The heat exchanger 19 removes the heat of compression from the air discharged from the compressor 11 and the filter unit 21 separates foreign matter from the air so that the air entering the reservoir 18 through the check valve 22 is substantially clean and dry. The air pressure in the reservoir 18 is utilized to actuate the air brakes of a motor vehicle, for example, through a brake line 23. In accordance with the invention, the filter unit 21 is also connected to the governor 15 through a control line 24, as described more fully hereafter.

As best shown in FIG. 2, the filter unit of the present invention comprises a casing 31 having an inlet port 32 connected to the heat exchanger 19, an outlet port 33 connected to the check valve 22, a control port 34 connected to the control line 24, and bleed discharge openings 35 open to the atmosphere. A filter body 36 is mounted within the casing 31 to intercept the flow of air through the unit from the inlet 32 to the outlet 33 to thereby entrap solid particles entrained in the air flowing therethrough. The bottom 37 of the casing 31 forms a sump to collect liquid particles or droplets which separate from the air flow during passage through the filter unit 21. An automatic bleeder unit 40 mounted in the bottom 37 includes a drain 38 which is normally closed by a valve element 39 responsive to the pressure in the control line 24. In the present instance, the valve element 39 closes the drain 38 when the compressor is operative and opens the drain when the compressor is inoperative to afford discharge of liquid from the sump 37 through the bleed-off openings 35.

In the filter unit illustrated in FIG. 2, the automatic bleeder control assembly 40 is threaded into the bottom of the casing 31 and is provided with an upstanding shaft 41 having a nut 42 thereon which may be removed to permit disassembly of the filter unit. The bleeder control unit comprises a hollow cylindrical member 44 for having an intermediate partition 45 which forms the drain port 38. The bleed-off openings 35 are positioned in the wall of the cylinder 44 below the partition 45 and similar openings 50 are provided above the partition. The valve element 39 includes a piston 46 mounted in the hollow cylinder 44 and having a sealing ring mounted thereon as indicated at 47. The piston, in turn, mounts a pair of frusto-conical valve members 47 and 48 formed of resilient material such as nylon, Teflon or the like, the conical surfaces of which converge toward a neck member 49 positioned intermediate the members 47 and 48. The members 47, 48 and 49 are assembled to an upstanding guide pin 51 operable to engage in a receptacle 52 in the bottom of the shaft member 41. A compression spring 53 encircles the guide pin 51 to bias the upper valve member 47 toward the drain port 38 and the lower valve member 48 away from the drain port 38.

The control port 34 opens into the cylinder below the piston 46 so that when air pressure is introduced into the control port 34, the pressure displaces the valve 39 upwardly against the bias of the spring 53 to open the drain 38 by disengaging the valve member 47 therefrom. The valve member 47 raises until a shoulder 51a of guide pin 51 engages the edge 52a of the receptacle 52. Thus, when air pressure is present in the control port 34, the valve remains in its upper limit position, and the drain 38 remains open. When the pressure in the control port 34 is relieved, the bias of the spring 53 displaces the valve element 39 downwardly, closing the drain 38 by engaging the valve member 47 thereagainst. The interval in which the drain 38 is open is determined by the length of time that the compressor is shut down.

The filter element 36 is slidably mounted on the shaft 41 and comprises a can 55 having perforate top and bottom walls enclosing a filter medium 56 therebetween. A circumferential sealing element 57 seals against the wall of the casing 31 to cause the air to noramlly flow through the perforate top and bottom and through the filter medium therebetween into the bottom of the casing. It is noted that the bottom of the can is extended below the perforate bottom wall to direct the air flowing through the can downwardly against the bottom 37 of the casing 31 prior to exhausting through the outlet opening 33. A light spring 58 is mounted intermediate the bottom wall of the can 55 and the bottom of the casing to bias the filter element 36 upwardly against a stop 59 provided on the stem 41. In normal operation, the filter element 36 is retained upwardly so that the seal 57 engages the casing wall 31. However, in the event that the filter becomes clogged with dirt or the like, the pressure of the air at the inlet 32 against the clogged filter element 36, displaces the element 36 downwardly against the pressure of the spring 58 to cause the sealing element 57 to disengage the wall of the casing 31 and permit the air to flow bypassing the filter element 36, thereby permitting the pressure from the air compressor to build up to the desired level in the reservoir 18.

The governor 15 is of substantially conventional construction including a casing 65 having a piston 66 slidable upwardly on an adjustable stem 64 against the bias of a spring 67. The piston mounts an exhaust tube 68 and a valve element 69. When the system is at rest, the governor is in the position shown in FIG. 2 wherein the control lines 14 and 24 are open to the exhaust line 16 through the exhaust tube 68 in the piston. This connection operates the compressor control to energize the compressor. As the compressor builds up the air pressure in the reservoir 18, it is transmitted to the chamber below the piston 66 by the line 17 causing the piston to elevate against the bias of the spring 67. As the piston rises, the bottom of the stem 64 engages against the exhaust tube 68, depressing it against the valve 69 and closing off the exhaust. When the reservoir pressure reaches its upper limit, as determined by the adjustment of the stem 64, the elevation of the piston causes the exhaust tube 68 to unseat the valve 69 from the piston, opening the lines 24 and 14 to the reservoir pressure in the chamber below the piston. When the reservoir pressure is introduced to the control 12, the compressor is shut down. Since the interior of the piston is thus subjected to the reservoir pressure, the piston does not effect reseating of the valve 69 until the reservoir pressure 17 drops substantially below the upper limit pressure to the lower limit pressure, thereby maintaining the reservoir within the pressure range between the upper and lower limit pressures.

From the foregoing, it is apparent that the filter element effectively removes solid particles from the air stream flowing from the heat exchanger to the reservoir. The construction of the can requires an abrupt change in the flow direction of the air adjacent the outlet of the filter unit causing any liquid particles or droplets to separate from the air stream and collect in the sump. When the compressor is arrested, the valve 39 is operated to discharge the accumulated liquid from the sump.

In order to assure sufficient air flow through the discharge opening 38, to blow-out the accumulated liquid in the sump, the heat exchanger 19 serves as an air accumulator in addition to removing the heat of compression from the compressed air. To this end, the heat exchanger 19 is constructed as shown in FIGS. 4 and 5. The illustrated heat exchanger 19 includes an elongated conduit 70, in the present instance of circular form, connected at one end to the compressor, for example through an inlet 71, and at the other end to the filter unit 21, for example through an outlet 72. The conduit 70 is provided with radiating fins 73, in the present instance having a square outline as shown in FIG. 5 disposed along the entire length of the conduit. A perforated guard plate 75 surrounds the finned conduit in spaced relation thereto to protect the fins from damage while affording air flow around the fins to assist in the radiation of heat from the conduit 70. As shown, the guard is open at the opposite ends to permit limited longitudinal flow therethrough in addition to radial flow through the apertures thereof.

In order to maximize heat transfer between the air flowing through the conduit 70 and the finned wall of the conduit, a deflector tube 77 is mounted interiorly of the conduit 70, for example by spacer members 78 arranged at spaced intervals along its length. As shown, the deflector tube 77 is closed at its leading end 79 and is open at its trailing end 80 so that the heat exchanger 19 may serve as an air accumulator. In operation, the air flowing through the conduit 70 is caused to pass in intimate contact with the interior walls of the conduit 70 by the deflector tube 77 and the pressure of the compressed air causes the air to accumulate within the deflector tube 77 during operation of the compressor. When the compressor is shut-down, the controls described above operate to open the drain 38 in the filter unit, thereby permitting the compressed air in the system between the compressor 11 and the check valve 22 to be vented to atmosphere through the discharge ports 35. The accumulated air within the heat exchanger 19 is of sufficiently large volume, when vented, to exhaust substantially all of the liquid accumulated in the sump 37 through the openings 38 and 35 in the interval when the valve 39 is being displaced from the closed position shown in FIG. 2 to the open position shown in FIG. 3, thus purging the system of accumulated liquid. With the compressor shut-down, additional liquid may drain into the sump 37 and this additional liquid, along with any liquid remaining from the first purging operation, is discharged when the compressor is again de-energized and the valve 39 is displaced from the position shown in FIG. 2, to the position shown in FIG. 3.

While a particular embodiment of the present invention has been herein illustrated and described, it is not intended to limit the invention to such disclosure, but changes and modifications may be made therein and thereto within the scope of the following claims.

I claim:

1. An air system having connected in a circuit a compressor, a reservoir, and a control means responsive to the pressure in said reservoir to energize and arrest said compressor to maintain the pressure level in said reservoir within a predetermined range; a filter unit intermediate said compressor and said reservoir for separating solid and liquid particles from the compressed air, and a heat exchanger intermediate said compressor and said filter unit to remove the heat of compression from the air in advance of said filter unit, said filter unit comprising an upright casing having a compressed air inlet adjacent the top thereof, a sump in the bottom thereof, and a compressed air outlet intermediate the top and bottom of said casing; a slidably mounted filtering element in said casing comprising a can mounted in said casing and having a sealing element thereabout adapted to normally engage the wall of the casing adjacent the top thereof intermediate said inlet and said outlet, a filter medium mounted in said can extending across the can, means to afford flow of compressed air axially therethrough, the sidewall of said can being imperforate and projecting below said compressed air outlet and spaced inwardly from the wall of the casing means normally operable when said sealing element is normally engaged to direct the air downwardly through the filter medium in said can toward said sump and then upwardly around the can toward and through said outlet, and operable when said filtering element is slidably displaced to disengage the sealing element from the wall of the casing to direct the air to bypass the filtering element, in normal operation said filtering medium operating to remove solid particles from said air flow prior to said sump, and said reversal of direction of the air flow therebelow operable to separate liquid particles therefrom; a bleeder unit mounted in said sump comprising a drain for said sump and a bleed outlet therefrom, a valve element mounted in said drain for displacement axially of said casing, and means biasing said valve element downwardly to normally close said drain; and means connecting said bleeder unit to said control unit operable to displace said valve upwardly away from its normal closed position upon arrest of said compressor and to open said sump drain and effect discharge of liquid accumulated in said sump during operation of said compressor; said heat exchanger having an inlet connected to said compressor, and an outlet connected to the compressed air inlet of the filter unit casing.

2. An air system according to claim 1 wherein said heat exchanger comprises an elongated finned conduit connected at its inlet to said compressor and at its outlet to said filter unit, and an elongated hollow tubular deflector mounted in said conduit and having a closed end toward the inlet end of said exchanger and an open end toward the outlet end of said exchanger, said deflector being closely spaced to said conduit to provide a narrow passageway for the air flow which effects intimate contact between the flowing air and said conduit, the closed and open ends of said hollow deflector operating to accumulate air in said heat exchanger for discharge from the system through said bleeder unit upon arrest of said compressor.

3. An air system according to claim 1 wherein said bleeder unit includes an upstanding shaft extending axially through said casing, said filter element being mounted on said shaft for axial displacement to disengage the sealing element thereof from said casing wall and afford air flow between said inlet and outlet by-passing said filter unit.

4. An air system according to claim 3 including spring means biasing said filter unit into sealing engagement with said casing wall against the flow of air through said casing whereby upon clogging of said filter unit, the air pressure displaces said filter unit against the bias of said spring to effect by-passing flow therearound.

5. An air system according to claim 1 wherein said bleeder unit includes a cylindrical member coaxial with said casing and forming said drain, a piston slidable in said cylinder and carrying said valve element, said connection from said control unit to said bleeder unit operable to introduce air pressure against said piston upon arrest of said compressor to thereby displace said valve element against its bias to open said sump outlet.

6. An air system according to claim 5 wherein the cylindrical member of said bleeder unit is threaded into and through the bottom of said sump of the casing and includes openings in the wall thereof above and below respectively and threaded connection to said casing, the drain of said sump being positioned intermediate said upper and lower openings in the bleeder unit.

7. An air system according to claim 5 wherein said valve element comprises a pair of valve members comprising an upper and lower member, at least the upper member having a frusto-conical wall converging toward and merging with said lower member within said drain, the frusto-conical wall of said upper member operable to normally close said outlet during operation of said compressor.

8. For an air system having connected in a circuit a compressor, a reservoir, and control means responsive to the pressure in said reservoir to energize and arrest said compressor to maintain the pressure level in said reservoir within a predetermined range; a filter unit intermediate said compressor and said reservoir for separating solid and liquid particles from the compressed air, comprising an upright casing having a generally cylindrical wall, a compressed air inlet adjacent the top thereof, a sump in the bottom thereof, a compressed air outlet intermediate said top and bottom in the wall of the casing, and a threaded discharge opening in the bottom of the sump;

a bleeder unit mounted in said sump comprising a hollow cylindrical member coaxial with said casing and threadedly engaged in said threaded discharge opening; a transverse partition in said cylindrical member having a central drain opening therein forming a valve seat and a bleed outlet from said sump; a valve element mounted in said member for displacement axially of said casing and said member, to engage and disengage said seat; means biasing said valve element to engage said seat to normally close said drain opening; and a piston slidably mounted in said cylindrical member below said partition and carrying said valve element;

means connecting said control unit to said bleeder unit operable to introduce air pressure against said piston upon arrest of said compressor to thereby displace said valve element away from its seat against the bias of said biasing means to disengage said seat and open said drain opening and effect discharge of liquid accumulated in said sump during operation of said compressor; and a movably mounted filtering element in said casing comprising a can having an imperforate cylindrical wall mounted in said casing coaxial with the cylindrical wall of said casing and having a sealing element mounted thereabout adapted to normally engage between the walls of the casing and the can adjacent to its upper ends intermediate said inlet and said outlet and to disengage to provide bypass of the filter element, a filter medium mounted in said can, means to afford flow of compressed air axially therethrough, the cylindrical wall of said can projecting from said sealing element to below said dischrarge outlet and being spaced inwardly from the cylindrical wall of said casing to provide an air passage within said casing surrounding said can communicating with said discharge outlet whereby the air flowing through said filter unit is normally directed first through said filter medium downwardly toward said sump and then upwardly through said passage to said outlet.

References Cited

UNITED STATES PATENTS

| | | | |
|---|---|---|---|
| 1,609,884 | 12/1926 | Priore | 165—134 |
| 1,805,658 | 5/1931 | Farmer | 55—309 |
| 1,970,420 | 8/1934 | Floret | 137—37 |
| 2,016,541 | 10/1935 | Campbell | 210—130 |
| 2,138,187 | 11/1938 | McElgin | 165—174 |
| 2,485,232 | 10/1949 | Brown | 137—203 |
| 2,535,760 | 12/1953 | Sherman et al. | |
| 2,646,885 | 7/1953 | James | 210—131 |
| 2,840,183 | 6/1958 | George | 55—267 |
| 2,962,119 | 11/1960 | White | 55—309 |
| 3,054,552 | 9/1962 | Doubleday et al. | 230—2 |
| 3,093,467 | 6/1963 | McLaughlin | 55—325 |

FOREIGN PATENTS 149,251  4/1937  Austria.

HARRY B. THORNTON, Primary Examiner

BERNARD NOZICK, Assistant Examiner.

U.S. Cl. X.R.

55—267, 309, 428; 23—18; 165—134, 174; 137—204